(12) United States Patent
Bourgeois et al.

(10) Patent No.: US 10,029,516 B2
(45) Date of Patent: Jul. 24, 2018

(54) TIRE WITH IMPROVED TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Frédéric Bourgeois, Clermont Ferrand (FR); François-Xavier Bruneau, Clermont-Ferrand (FR); Patrice Fraysse, Clermont-Ferrand (FR); Emmanuel Igier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 117 days.

(21) Appl. No.: 15/106,822

(22) PCT Filed: Dec. 4, 2014

(86) PCT No.: PCT/EP2014/076495
§ 371 (c)(1),
(2) Date: Jun. 20, 2016

(87) PCT Pub. No.: WO2015/090983
PCT Pub. Date: Jun. 25, 2015

(65) Prior Publication Data
US 2017/0001476 A1 Jan. 5, 2017

(30) Foreign Application Priority Data
Dec. 19, 2013 (FR) ..................... 13 63034

(51) Int. Cl.
B60C 11/00 (2006.01)
B60C 1/00 (2006.01)
B60C 11/03 (2006.01)

(52) U.S. Cl.
CPC ........ *B60C 11/0066* (2013.01); *B60C 1/0016* (2013.01); *B60C 11/0008* (2013.01);
(Continued)

(58) Field of Classification Search
CPC ......... B60C 11/0008; B60C 2011/0016; B60C 2011/0025; B60C 11/0041; B60C 11/005;
(Continued)

(56) References Cited

U.S. PATENT DOCUMENTS

2004/0112490 A1\* 6/2004 Sandstrom .............. B60C 11/18
152/152.1
2004/0118495 A1\* 6/2004 Sandstrom ............ B60C 1/0016
152/209.5
(Continued)

FOREIGN PATENT DOCUMENTS

EP 1 308 319 11/2001
EP 2 565 056 3/2013
(Continued)

*Primary Examiner* — Eric Hug
(74) *Attorney, Agent, or Firm* — Cozen O'Connor

(57) ABSTRACT

Tire comprising a tread which has at least one central rib (411-413) and two lateral ribs (421-422) which are separated by circumferential grooves (141-144), in which tire a first lateral rib (421) adjacent to the outer axial edge of the tread and at least one (and preferably each) of the central ribs have a first portion (4211, 4111, 4121, 4131) the axial width of which exceeds 2 % of the axial width of the relevant rib made and the depth of which is less than that of the relevant rib, from a rubber composition containing an elastomer and a reinforcing filler consisting predominantly of carbon black, and an axially adjacent second portion (4212, 4112, 4122, 4132) made of a rubber composition containing an
(Continued)

elastomer and a reinforcing filler a minority proportion of which consists of carbon black, in which the rubber compositions that make up the second portion of the first lateral rib and the second portion of the central rib all have a tan 50 value which is higher than the tan 50 value of the rubber compositions that form the first portion of the first lateral rib and the first portion of the central rib, the tan 50 values being measured at a temperature of 0° C. and under a stress of 0.7 MPa.

12 Claims, 4 Drawing Sheets

(52) U.S. Cl.
CPC ...... *B60C 11/0058* (2013.01); *B60C 11/0302* (2013.01); *B60C 11/0304* (2013.01); *B60C 11/0306* (2013.01); *B60C 2011/0025* (2013.01); *B60C 2011/0353* (2013.01); *B60C 2011/0355* (2013.01)

(58) Field of Classification Search
CPC ............ B60C 11/0058; B60C 11/0066; B60C 11/0302; B60C 11/0304; B60C 11/0306; B60C 1/0016; B60C 2001/0083

USPC .................................. 152/209.5, 209.8, 905
See application file for complete search history.

(56) References Cited

U.S. PATENT DOCUMENTS

| | | | |
|---|---|---|---|
| 2012/0305156 A1* | 12/2012 | Faure | B60C 11/0058 152/450 |
| 2013/0048169 A1* | 2/2013 | Erceg | B60C 11/0066 152/209.5 |
| 2014/0190605 A1* | 7/2014 | Muhlhoff | B60C 1/0016 152/209.5 |
| 2016/0137001 A1* | 5/2016 | Bourgeois | B60C 11/0041 152/209.5 |

FOREIGN PATENT DOCUMENTS

| | | |
|---|---|---|
| FR | 2 952 855 | 5/2011 |
| WO | WO 2011/076680 | 6/2011 |
| WO | WO 2012/175444 | 12/2012 |

\* cited by examiner

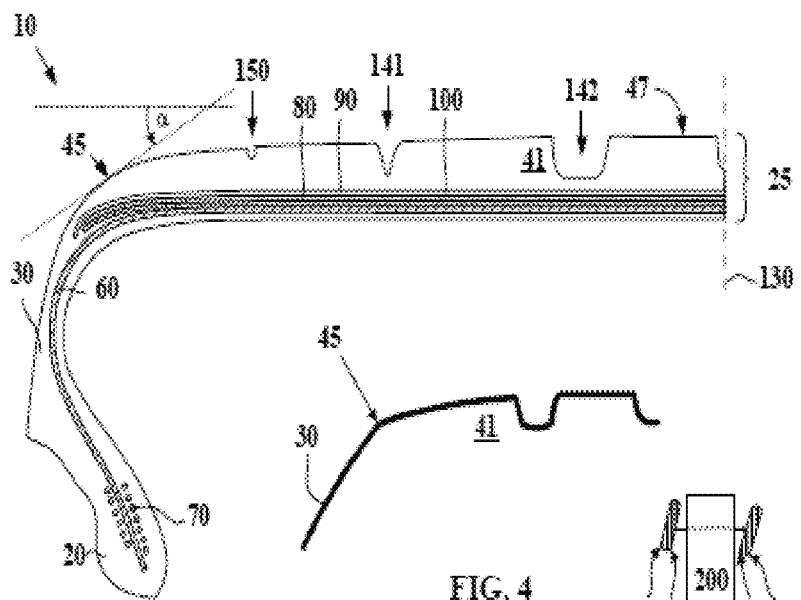
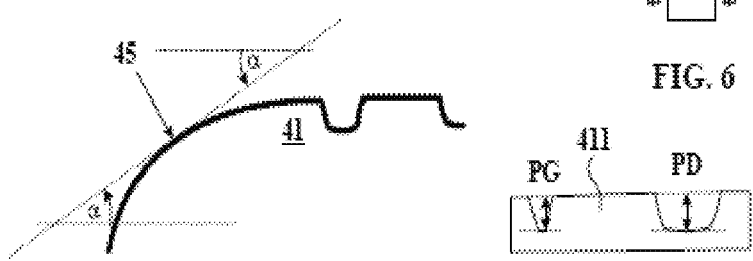
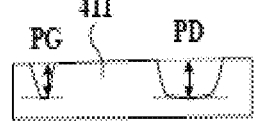
FIG. 3 (PRIOR ART)
FIG. 4
FIG. 5
FIG. 6
FIG. 7
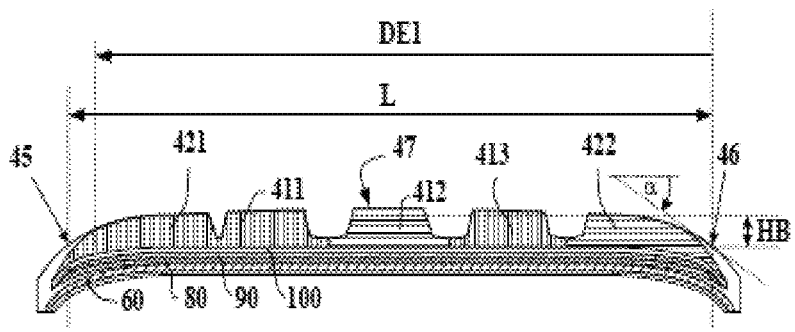
FIG. 8 (PRIOR ART)

TIRE WITH IMPROVED TREAD

RELATED APPLICATIONS

This is a U.S. National Phase Application under 35 USC 371 of International Application PCT/EP2014/076945 filed on Dec. 4, 2014.

This application claims the priority of French application no. 1363034 filed Dec. 19, 2013, the entire content of which is hereby incorporated by reference.

FIELD OF THE INVENTION

The present invention relates to tires for passenger vehicles. It relates more particularly to tires suited to a sporty on-road driving style.

BACKGROUND

The grip of the tires on the ground on which they are running is, from a driver safety viewpoint, one of the most important features of a vehicle that is fitted with tires. It is also what governs the performance of the vehicle in sporty on-road driving: if its tires lose their ability to steer as a result of a lack of grip, the vehicle can no longer be steered.

Of course, a vehicle, even if intended for sporting use, has to drive under variable weather conditions. It is therefore known practice to provide the tire with means that provide good grip on dry ground and on wet ground. Notably it is possible to adapt at least part of the tread pattern to use on wet ground, for example by providing voids able to store water and/or allow water to drain away, or by increasing the number of edge corners on the tread pattern so as to cut through the film of water formed between the tread and the ground. It is also possible to vary the materials of which the tread is made, by using rubber compositions that are more particularly suited to use on wet ground and/or on dry ground. A tread having both types of rubber composition is able to provide good grip under all circumstances. An example of such a tire is given in document EP 1 308 319.

During sporty on-road driving, the tires of a vehicle experience high transverse loadings when the vehicle fitted with these tires is cornering. During the corner, the transverse loadings cause the contact patch in which each tire makes contact with the ground on which it is running, to undergo deformation that can be likened to skewing into a trapezium shape: the side of the contact patch that is furthest from the centre of the corner lengthens, whereas the side of the contact patch which is closest to the centre of the corner shortens.

The "side of the contact patch that is furthest from the centre of the corner" is the side via which, in the direction of the rate of drift of the centre of the wheel on which the tire is mounted, the elements of the tread come into contact with the ground. For this reason, it is sometimes referred to as the (transverse) leading edge. The opposite side, namely the "side of the contact patch closest to the centre of the corner" is sometimes referred to as the (transverse) trailing edge.

This "trapezoidal skew" deformation alters both the load borne by the various ribs of the tread and the contribution that each makes to the transverse loading developed by the tire. For a given load, that one of the tires of the vehicle has to bear in a given cornering rate, the ribs which have lengthened bear a greater share of the total load borne by the tire. The ribs that have shortened bear a correspondingly smaller proportion of the total load borne by the tire. For a given transverse loading, delivered by one of the tires under given cornering conditions, the result is that the most heavily loaded ribs (which in general means those on the side furthest from the centre of the corner) are those which also make the greatest contribution towards the total transverse loading.

Rubber compositions suited to use on wet ground are generally more sensitive to the very high thermal and mechanical stresses generated in the contact patch of a tire under severe cornering conditions on a dry road surface. If the tread of the tire is provided with portions made of a rubber composition that has better grip on dry ground and with portions made of rubber composition that has better grip on wet ground, it is preferable to ensure that the rubber composition that has better grip on dry ground is positioned on that side of the contact patch which is furthest away from the centre of the corner. Thus, even if the contact patch is skewed into a trapezium shape, the tire will maintain good grip on dry ground, which means to say that it will maintain a good ability to develop a high transverse loading. Furthermore, because the ground contact pressures are highest on this same side of the contact patch (which is the side furthest away from the centre of the corner), it is this part of the contact patch that generally provides the best drainage of the water wetting the road surface. As a result, this region of the tread lends itself well to the use of a rubber composition that exhibits better grip on dry ground. In other words, in this region, the tire drives as if it were driving along dry ground. There is therefore no benefit in making this part of the tread from a rubber composition that exhibits better grip on wet ground but of which the performance on dry ground is inferior to that of a rubber composition that exhibits better grip on dry ground. The "Pilot Sport 2" tire sold by Michelin is one example of a tire that has such an arrangement of rubber compositions in its tread.

Despite the good performance exhibited by this tire in terms of grip, there is still an increasing need to improve the compromise between dry grip and wet grip of tires and, more particularly, tires designed for sporty on-road driving. This is why the applicant company, in its patent applications WO 2011/076680 A1 and WO 2012/175444 A1, has proposed dividing the tread into several axis zones and distributing the rubber compositions with better wet grip and the rubber compositions with better dry grip carefully across these zones. While these solutions have made it possible to obtain a better compromise between dry grip and wet grip, they are not, however, optimal in terms of grip on wet ground or of rolling resistance.

SUMMARY OF THE INVENTION

One of the objectives of the present invention is therefore to provide a tire that provides a better compromise between wet grip and dry grip while at the same time affording improvements with regard to rolling resistance.

This objective is achieved by a tire which has a predetermined direction of mounting, in which a portion of that part of the tread that is traditionally reserved for the rubber compositions that have better grip on wet ground is made from a rubber composition that has better grip on dry ground, and a portion of the part of the tread that is traditionally reserved for rubber compositions that have better grip on dry ground is made of a rubber composition that has better grip on wet ground. This part extends as far as a depth of the tread that is less than the depth of the circumferential grooves provided in this tread.

More specifically, the objective is achieved by a tire intended to be mounted on a mounting rim of a wheel of a vehicle and having a predetermined direction of mounting on the vehicle, comprising a tread extending between an outer axial edge and an inner axial edge, the inner axial edge being the edge intended to be mounted on the vehicle body shell side when the tire is mounted on the vehicle in the said predetermined direction of mounting, the axial distance between the outer axial edge and the inner axial edge defining an axial width L of the tread. The tread comprises, in any radial section, at least one central rib and two lateral ribs, the lateral ribs being positioned one on each side of the said at least one central rib, the ribs being separated by circumferential grooves each having two lateral walls. Each central rib is axially delimited by an outer boundary and by an inner boundary, each boundary being formed by a lateral wall of a circumferential groove, the inner boundary being axially closer to the inner axial edge of the tread than the outer boundary, the axial distance, on the tread surface in the new state, between the outer boundary and the inner boundary defining an axial width LC of the central rib. A first lateral rib is adjacent to the outer axial edge of the tread and delimited axially by an outer boundary (FE1) and an inner boundary, the outer boundary being situated, over the entire radial depth of the first lateral rib, an axial distance DEI from the inner axial edge of the tread, the distance DEI being greater than or equal to 0.95 L, the inner boundary being formed, at least in part, by a lateral wall of a circumferential groove, the axial distance between the outer boundary and the inner boundary defining an axial width LL1 of the first lateral rib. The first lateral rib and at least one (and preferably each) of the central ribs comprise a first portion made of a rubber composition containing at least one elastomer and at least one reinforcing filler containing a carbon black, the carbon black representing a percentage greater than or equal to 50% and less than or equal to 100% of the weight of all the reinforcing filler, and a second portion made of a rubber composition containing at least one elastomer and at least one reinforcing filler, possibly including a carbon black, the carbon black representing a percentage greater than or equal to 0% and less than or equal to 50% of the weight of all the reinforcing filler. The first portion of the first lateral rib extends from the outer boundary of the first lateral rib axially inwards, the axial width LP1 of this portion being, over the entire radial depth of the lateral rib, greater than or equal to 20% of the axial width LL1 of the first lateral rib. The second portion of the first lateral rib is axially adjacent to the first portion of the first lateral rib. The first portion of the central rib extends axially from the outer boundary of the central rib, the axial width LPC of this portion being, over at least 75% (and preferably 90%, and even more preferably over 100%) of the radial depth PR of the central rib, greater than or equal to 20% of the axial width LC of the central rib, and radially from the tread surface, when new, down to a radial depth P, the radial depth P being able to vary as a function of the axial position, the depth P being, over at least 75% (and preferably 90% and more preferably still, 100%) of the axial extent of the first portion of the central rib, greater than or equal to 0.2 PR and less than or equal to 0.8 PR (and preferably less than or equal to 0.75·PR). The second portion of the central rib is axially adjacent to the first portion of the central rib. The rubber compositions that make up the second portion of the first lateral rib, the portion radially on the inside of the first portion of the central rib and the second portion of the central rib all have a tan δ0 value which is higher than the tan δ0 value of the rubber compositions that form the first portion of the first lateral rib and the first portion of the central rib, where tan δ0 denotes the tan δ value measured at a temperature of 0° C. and under a stress of 0.7 MPa.

This tire makes it possible to obtain a marked improvement in grip on wet ground while at the same time maintaining excellent grip on dry ground and affording improvements with regard to rolling resistance.

For preference, the said percentage of the carbon black in terms of the weight of all the reinforcing filler is not the same for the said first rubber composition and for the said second rubber composition; the difference between the percentage of carbon black in the said first rubber composition and the percentage of carbon black in the said second rubber composition is preferably greater than 5 points and more preferably still, greater than 10 points.

According to a first advantageous embodiment, the axial width LP1 of the first portion of the first lateral rib is, over the entire radial depth of the first lateral rib, less than or equal to 60% of the axial width LL1 of the first lateral rib. Wet grip is thus preserved.

According to a second advantageous embodiment, the axial width LPC of the first portion of the central rib is, over its entire radial depth, less than or equal to 60% of the axial width LC of the central rib. This embodiment also contributes to preserving good wet grip.

According to a third advantageous embodiment, a second lateral rib is adjacent to the inner axial edge of the tread and axially delimited by an outer boundary and an inner boundary, the inner boundary being situated, over the entire radial depth of the second lateral rib, an axial distance DE2 from the outer axial edge of the tread, the distance DE2 being greater than or equal to 0.95 L, the outer boundary being formed, at least in part, by a lateral wall of a circumferential groove, the axial distance between the outer boundary and the inner boundary defining an axial width LL2 of the second lateral rib. This axial width may vary according to the radial depth of the second lateral rib. The second lateral rib comprises a first portion made of a rubber composition containing at least one elastomer and at least one reinforcing filler containing a carbon black, the carbon black representing a percentage greater than or equal to 50% and less than or equal to 100% of the weight of all the reinforcing filler, and a second portion made of a rubber composition containing at least one elastomer and at least one reinforcing filler, possibly including a carbon black, the carbon black representing a percentage greater than or equal to 0% and less than or equal to 50% of the weight of all the reinforcing filler. The first portion of the second lateral rib extends from the outer boundary of the second lateral rib axially outwards, the axial width LP2 of this portion being, over at least 75% (and preferably 100%) of the radial depth of the second lateral rib, greater than or equal to 20% of the axial width LL2 of the second lateral rib, and the second portion of the second lateral rib is axially adjacent to the first portion of the second lateral rib. The rubber composition forming the second portion of the second lateral rib has a tan δ0 value which is higher than the tan δ0 value of the rubber composition that forms the first portion of the second lateral rib, where tan δ0 denotes the tan δ value measured at a temperature of 0° C. and under a stress of 0.7 MPa. This embodiment makes it possible to increase the dry grip of the tire situated on the inside of the corner; this tire thus makes a greater contribution towards the total transverse loading.

For preference, the axial width LP2 of the first portion of the second lateral rib is less than or equal to 60% of the axial width LL2 of the second lateral rib. This limitation contributes to preserving the wet grip.

According to a fourth advantageous embodiment, for each rib comprising a first and a second portion, the difference between the tan δ0 value of the rubber composition that forms the first portion of the rib and the tan δ0 value of the rubber composition that forms the second portion of the same rib is greater than or equal to 0.05. As already mentioned, tan δ0 denotes the tan δ value measured at a temperature of 0° C. and under a stress of 0.7 MPa.

According to a fifth advantageous embodiment, for each rib comprising a first and a second portion, the rubber composition that forms the first portion of the rib also has a tan δ10 value which is higher than the tan δ10 value of the rubber composition that forms the second portion of the same rib, where tan δ10 denotes the tan δ value measured at a temperature of 10° C. and under a stress of 0.7 MPa.

For preference, for each rib comprising a first and a second portion, the difference between the tan δ10 value of the rubber composition that forms the first portion of the rib and the tan δ10 value of the rubber composition that forms the second portion of the same rib is greater than or equal to 0.05.

According to a sixth advantageous embodiment, the same rubber composition forms the first portion of all the ribs that have a first and a second portion, and the same rubber composition forms the second portion of these ribs. This embodiment has the advantage of ease of industrial production.

Of course, it is possible and even desirable to combine two or more of the embodiments described.

BRIEF DESCRIPTION OF THE DRAWINGS

FIG. 3 is a depiction, in radial section, of a portion of a tire according to the prior art.

FIGS. 4 and 5 illustrate how the axial edge of a tread is determined.

FIG. 6 illustrates the terms "inner edge" and "outer edge" of a tread.

FIG. 7 illustrates the radial depth of a central rib.

FIG. 8 schematically depicts the crown of a tire according to the prior art, in radial section.

DETAILED DESCRIPTION OF THE DRAWINGS

Figure 1:
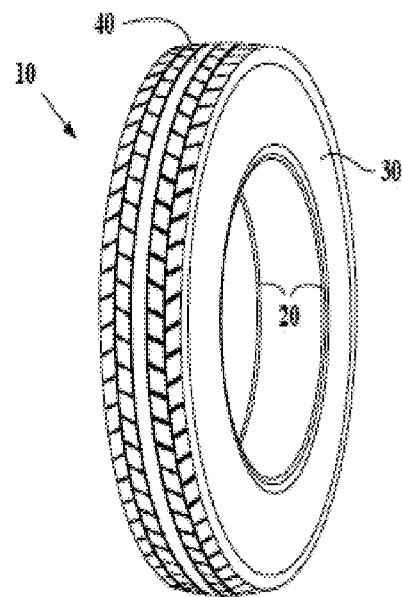
FIG. 1 depicts a tire according to the prior art.

When using the term "radial" it is appropriate to make a distinction between the various uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distances are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, chords, folded yarns or equivalent assemblies, irrespective of the material of which the thread is made or of the surface treatment it has received in order to encourage it to bond with the rubber.

Finally, a "radial section" or "radial cross section" here means a section or a cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the mid-plane of the tire than is the point P6. Conversely, a point P7 is said to be "axially outside" a point P8 (or "axially on the outside of" the point P8) if it is further away from the mid-plane of the tire than is the point P8. The "mid-plane" of the tire is the plane which is perpendicular to the axis of rotation of the tire and which lies equal distances from the annular reinforcing structures of each bead.

A "circumferential" direction is a direction which is perpendicular both to a radius of the tire and to the axial direction. A "circumferential cross section" is a cross section on a plane perpendicular to the axis of rotation of the tire.

A "tread surface" here means all of those points of the tread of a tire which are able to come into contact with the ground when the tire is being driven on.

A rib is said to be "adjacent to the outer (or inner) edge" of the tread when it comprises the outer (or inner) edge or when there is no other rib positioned axially between the said outer (or inner) edge and the rib in question.

The "radial depth" of a rib is defined as the maximum depth of the groove adjacent to the rib if the rib is delimited only by a single groove, as is generally the case with the lateral ribs. If the rib is axially delimited by two grooves (as is the case with the central ribs), its radial depth is defined as the greater of the maximum depths of its two adjacent grooves.

The expression "rubber composition" denotes a composition of rubber containing at least one elastomer and one filler.

FIG. 1 schematically depicts a tire 10 according to the prior art. The tire 10 comprises a crown comprising a crown reinforcement (not visible in FIG. 1) surmounted by a tread 40, two side walls 30 extending the crown radially inwards, and two beads 20 radially on the inside of the side walls 30.

Figure 2:
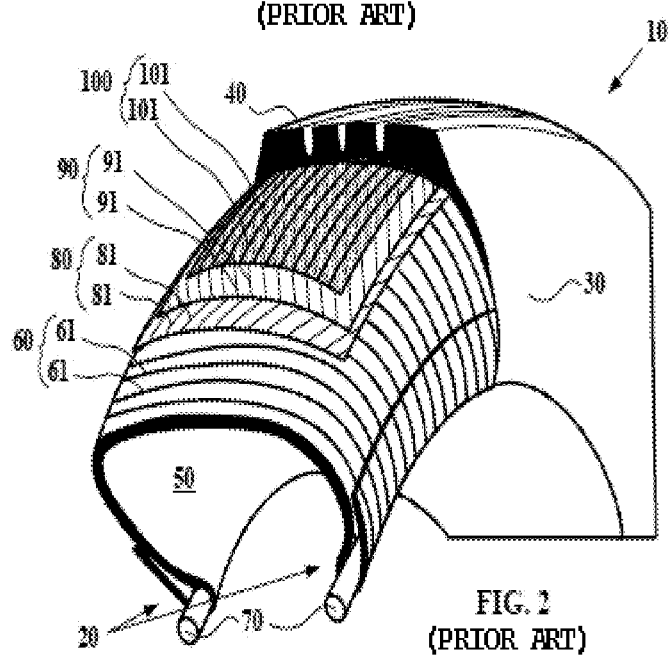
FIG. 2 is a partial perspective view of a tire according to the prior art.

FIG. 2 schematically depicts a partial perspective view of a tire 10 according to the prior art and illustrates the various components of the tire. The tire 10 comprises a carcase reinforcement 60 made up of threads 61 coated with rubber composition and two beads 20 each comprising annular reinforcing structures 70 which hold the tire 10 on the rim (not depicted). The carcase reinforcement 60 is anchored in each of the beads 20. The tire 10 further comprises a crown reinforcement comprising two plies 80 and 90. Each of the plies 80 and 90 is reinforced with threadlike reinforcing elements 81 and 91 which are parallel within each layer and crossed from one layer to the other, making angles of between 10° and 70° with the circumferential direction. The tire further comprises a hoop reinforcement 100, arranged radially on the outside of the crown reinforcement, this hoop reinforcement being formed of reinforcing elements 101 oriented circumferentially and wound in spirals. A tread 40 is laid on the hoop reinforcement; it is this tread 40 which provides contact between the tire 10 and the road. The tire 10 depicted is a "tubeless" tire: it has an inner liner 50 made of a rubber composition that is not permeable to the inflating gas, covering the interior surface of the tire.

FIG. 3 schematically depicts, in radial section, one portion of a reference tire 10 of the "Pilot Sport 2" type sold by Michelin. The tire 10 comprises two beads 20 intended to come into contact with the mounting rim (not depicted), each bead 20 comprising a plurality of annular reinforcing structures 70. Two side walls 30 extend the beads 20 radially outwards and join together in a crown 25 comprising a crown reinforcement formed of a first layer of reinforcing elements 80 and of a second layer of reinforcing elements 90 and radially surmounted by a hoop reinforcement 100 which is itself radially surmounted by a tread. Two grooves 141 and 142 may be seen; the incision 150 is not considered to be a groove within the meaning of the invention because only an incision which, when the tire is in the new state, has a radial depth greater than or equal to 5 mm and a maximum axial width greater than or equal to 2 mm is considered to be a "groove" within the meaning of this document. The midplane of the tire is indicated by the reference 130.

The way in which the axial edges of a tread are determined is illustrated in FIGS. 4 and 5 each of which show the profile of half a tread 41 and of the part of the side wall 30 adjacent to it. In certain tire designs, the transition from the tread to the side wall is very marked, as in the case depicted in FIG. 4, and determining the axial edge 45 of the half-tread 41 can be done intuitively. However, there are tire designs in which the transition between tread and side wall is continuous. An example is given in FIG. 5. The edge of the tread is then determined as follows. The tangent to the tread surface of the tire at any point on the tread surface in the region of transition between tread and side wall is plotted onto a radial section of the tire. The axial edge is the point at which the angle α (alpha) between the said tangent and an axial direction is equal to 30°. When there are several points at which the angle α (alpha) between the said tangent and an axial direction is equal to 30°, the point adopted is the point that is radially furthest towards the outside. In the case of the tire depicted in FIG. 3, the axial edge 45 has been determined this way.

Each layer of reinforcing elements 80 and 90 comprises threadlike reinforcing elements coated in a matrix made of rubber composition. The reinforcing elements of each layer are substantially parallel to one another; the reinforcing elements of the two layers are crossed from one layer to another at an angle of around 20°, as is well known to those skilled in the art of tires referred to as radial tires.

The tire 10 also comprises a carcase reinforcement 60 which extends from the beads 20 through the side walls 30 to the crown 25. This carcase reinforcement 60 in this instance comprises threadlike reinforcing elements oriented radially, namely which make with the circumferential direction an angle greater than or equal to 80° and less than or equal to 90°.

The carcase reinforcement 60 comprises a plurality of carcase reinforcing elements; it is anchored in the two beads 20 between the annular reinforcing structures 70.

FIG. 8 schematically depicts the crown of a tire according to document WO 2011/076680 A1, intended to be mounted on a mounting rim of a wheel of a vehicle and having a predetermined direction of mounting on the vehicle. It comprises a tread extended between an outer axial edge 45 and an inner axial edge 46, the inner axial edge 46 being the edge intended to be mounted on the vehicle body shell side when the tire is mounted on the vehicle in the said predetermined direction of mounting, as suggested in FIG. 6 which schematically indicates a vehicle 200. The tread surface is indicated by the reference 47.

The tread comprises, in any radial section, three central ribs 411 to 413 and two lateral ribs 421 and 422 which are positioned on each side of the central ribs. The ribs are separated by circumferential grooves each having two lateral walls.

Figure 9:
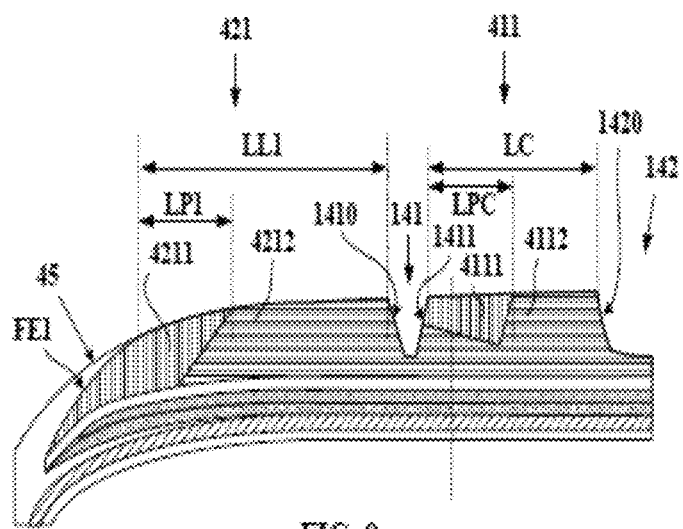
FIGS. 9 and 14 illustrate the various measurements that characterize the lateral ribs and the central ribs.

FIG. 9 illustrates the various parameters that characterize the first lateral rib 421 and the central rib 411. The central rib 411 is axially delimited by an outer boundary, formed by the lateral wall 1411 of the circumferential groove 141 and situated on the side of the outer axial edge 45 of the tread, and an inner boundary, formed by the lateral wall 1420 of the circumferential groove 142 and situated on the side of the inner axial edge 46 of the tread (see FIG. 8). The axial distance, on the tread surface in the new state, between the outer boundary and the inner boundary defines the axial width LC of the central rib.

The first lateral rib 421 is adjacent to the outer axial edge 45 of the tread and axially delimited by an outer boundary FE1 and an inner boundary, which is formed by the lateral wall 1410 of the circumferential groove 141. The outer boundary is located, over the entire radial depth of the first lateral rib 421, at an axial distance DE1 (see FIG. 8) from the inner axial edge 46 of the tread, the distance DE1 being greater than or equal to 0.95·L. In FIG. 8, the axial distance DE1 of the first lateral rib 421 on the tread surface in the new state is indicated; here DE1 is equal to 0.96·L. The axial distance between the outer boundary and the inner boundary defines an axial width LL1 (see FIG. 9) of the first lateral rib 421. In this particular instance, this axial width varies according to the radial depth of the first lateral rib 421.

In the crown depicted in FIG. 8, the central rib 412 and the second lateral rib 422 are made of a first rubber composition containing an elastomer and at least one reinforcing filler possibly including a carbon black, the carbon black representing a percentage greater than or equal to 0% and less than or equal to 50% of the weight of all the reinforcing filler.

In contrast, the first lateral rib 421 and the central ribs 411 and 413 are made of a second rubber composition that contains an elastomer and at least one reinforcing filler including a carbon black, the carbon black representing a percentage greater than or equal to 50% and less than or equal to 100% of the weight of all the reinforcing filler.

The first rubber composition has a tan δ0 value which is higher than the tan δ0 value of the second rubber composition, where tan δ0 denotes the tan δ value measured at a temperature of 0° C. and under a stress of 0.7 MPa.

The central ribs 411 and 413 are made entirely of this second rubber composition; in other words, for each of these ribs, the portion made from this second rubber composition has an axial width equal to 100% of the axial width LC of the central rib.

While this solution has made it possible to achieve an excellent compromise between wet ground and dry ground, there is still room for improvement in terms of wet grip and of rolling resistance. Such an improvement is achieved using a tire according to one embodiment of the invention. FIGS. 9 to 12 depict embodiments of this tire.

Figure 10:
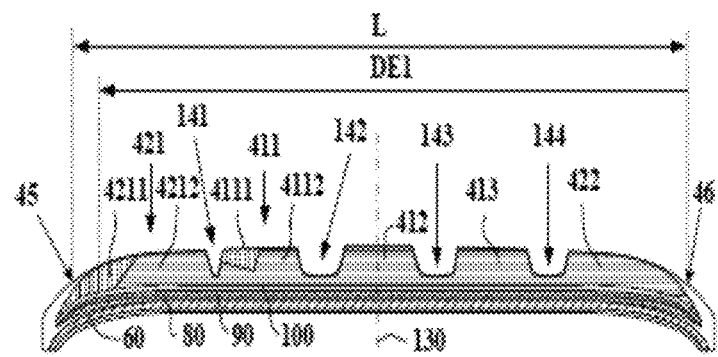
FIGS. 10 to 13 schematically depict the crown of a tire according to one embodiment of the invention, in radial section.

The tire the crown of which is depicted in FIG. 10 is intended to be mounted on a mounting rim of a vehicle wheel (not depicted); it has a predetermined direction of mounting on the vehicle, comprising a tread extending between an outer axial edge 45 and an inner axial edge 46, the inner axial edge 46 being the edge intended to be mounted on the vehicle body shell side when the tire is mounted on the vehicle in the said predetermined direction of mounting (see FIG. 6). The axial distance between the outer axial edge 45 and the inner axial edge 46 defines the axial width L of the tread.

The tread comprises, in any radial section, three central ribs 411 to 413 and two lateral ribs 421 and 422, the lateral ribs 421 and 422 being positioned one on each side of the central ribs 411 to 413. The ribs are separated by circumferential grooves 141 to 144 each having two lateral walls. Each of the central ribs 411 to 413 is axially delimited by an outer boundary and by an inner boundary, each boundary being formed, over the entire depth of the adjacent circumferential grooves (141 to 143) by a lateral wall of one circumferential groove, the inner boundary being axially closer to the inner axial edge 46 of the tread than the outer boundary. The axial distance, on the tread surface in the new state, between the outer boundary and the inner boundary defining an axial width LC for each of the central ribs (see FIG. 9 in which the axial width LC is indicated for the central rib 411). In this instance, these axial widths LC are substantially identical for the three central ribs 411 to 413, but this does not have to be the case.

The first lateral rib 421 is adjacent to the outer axial edge 45 of the tread. In this particular instance, the first lateral rib 421 does not include the outer axial edge 45 because it is covered at its end with a portion of rubber composition that forms the side wall of the tire, but it is nonetheless adjacent to the outer axial edge 45 in as much as there is no other rib situated between the outer axial edge 45 and the first lateral rib 421. The first lateral rib 421 is delimited axially by an outer boundary FE1 (see FIG. 9) and an inner boundary which coincides, over the entire depth of the circumferential groove 141, with the lateral wall 1410 of the circumferential groove 141 (see FIG. 9). The outer boundary is situated, over the entire radial depth of the first lateral rib, an axial distance DE1 from the inner axial edge of the tread, the distance DE1 being greater than or equal to 0.95·L. In FIG. 10, the axial distance DE1 of the first lateral rib 421 on the tread surface in the new state has been indicated; here, DE1 is equal to 0.96·L. The axial distance between the outer boundary and the inner boundary defines an axial width LL1 (see FIG. 9) of the first lateral rib 421. In this particular instance, this axial width varies according to the radial depth of the first lateral rib 421.

The first lateral rib 421 and the central ribs 411 each comprise a first portion (4211 and 4111 respectively) made from a rubber composition containing at least one elastomer and at least one reinforcing filler including a carbon black, the carbon black representing a percentage greater than or equal to 50% and less than or equal to 100% of the weight of all the reinforcing filler, and a second portion (4212 and 4112 respectively) made of a rubber composition containing at least one elastomer and at least one reinforcing filler, possibly including a carbon black, the carbon black representing a percentage greater than or equal to 0% and less than or equal to 50% of the weight of all the reinforcing filler.

The first portion 4211 of the first lateral rib 421 extends from the outer boundary FE1 (see FIG. 9) of the first lateral rib 421 axially inwards, the axial width LP1 (see FIG. 9) of this portion being, over the entire radial depth of the lateral rib, greater than or equal to 20% of the axial width LL1 of the first lateral rib 421. In FIG. 9, the axial width LP1 of the first portion 4211 of the first lateral rib 421 on the tread surface in the new state has been indicated; here, the width LP1 is equal to 0.40·LL1. The second portion 4212 of the first lateral rib 421 is axially adjacent to the first portion 4211 of the first lateral rib 421; it extends, over the entire depth of the first lateral rib 421, from the end of the first portion 4211 to the inner boundary of the first lateral rib 421.

The first portion 4111 of the central rib 411 extends:
axially from the outer boundary of the central rib 411, the axial width LPC (see FIG. 9) of this first portion 4111 being, over 80% of the radial depth PR of the central rib, greater than or equal to 20% of the axial width LC of the central rib 411;
radially from the tread surface when new, as far as a radial depth P, the radial depth P being able to vary as a function of the axial position—this is the case in FIG. 9—the depth P being, over 95% of the axial extent of the first portion of the central rib, greater than or equal to 0.2·PR and less than or equal to 0.8·PR.

FIG. 7 illustrates how the radial depth PR of a central rib is determined. Specifically, PR, the radial depth PR, is defined as being the greatest of the maximum depths PG and PD of the grooves that lie axially on each side of the radial rib and delimit same: in this instance, PR equals PD. The maximum depths PG and PD are determined with respect to the tread surface as may be interpolated between two adjacent ribs.

In FIG. 9, the axial width LPC of the first portion 4111 of the first lateral rib 411 on the tread surface in the new state has been indicated; here, the width LPC is equal to 0.50·LC. The second portion 4112 of the central rib 411 is axially adjacent to the first portion 4111 of the central rib 411; it extends from the end of the first portion 4111 to the inner boundary of the first central rib 411 (which coincides, over the entire depth of the circumferential groove 142, with the lateral wall 1420 thereof).

The rubber compositions that make up the second portion of the first lateral rib, the portion radially on the inside of the first portion of the central rib and the second portion of the central rib all have a tan δ0 value which is higher than the tan δ0 value of the rubber compositions that form the first portion of the first lateral rib and the first portion of the central rib.

This tire according to one embodiment of the invention makes it possible to obtain a marked improvement in wet grip while at the same time maintaining excellent grip on dry ground. The applicant company explains this surprising discovery as follows: in a tire according to one embodiment of the invention, unlike the reference tire, the outer lateral rib is made of a rubber composition that provides good grip in the wet. This runs counter to the teaching of document WO 2011/076680 according to which it is appropriate to create the outer rib from a rubber composition that provides good grip on dry ground, in order to put the trapezoidal shape of the contact patch to good use. Now, driving with a great deal of side slip or drifting (i.e. under the conditions encountered when driving on a circuit), a significant part of the outer lateral rib is seen to blister, which means that the rubber composition that confers good grip on dry ground is unable to provide all of the hoped-for benefit at this point. By arranging this rubber composition on the outer edge of the first lateral rib and on the outer edge of (at least) one central rib, it is possible to achieve both good grip on dry ground and protection of the central ribs against premature wear.

Furthermore, the reduced depth of the first portion of the central rib contributes to the reduction in the rolling resistance of the tire.

Figure 11:
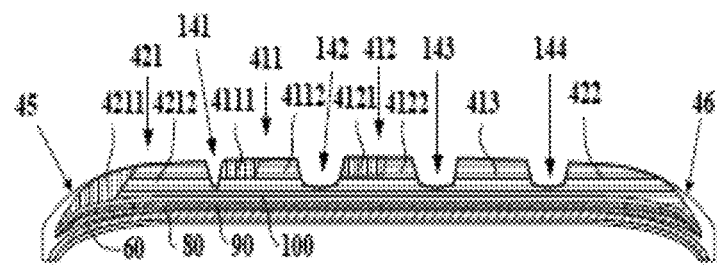

FIG. 11 schematically depicts the crown of another tire according to one embodiment of the invention. Unlike the tire depicted in FIG. 10, this tire comprises two central grooves 411 and 412 each having the first portion (4111 and 4121 respectively) made of a rubber composition containing at least one elastomer and at least one reinforcing filler containing a carbon black, the carbon black representing a percentage greater than or equal to 50% and less than or equal to 100% of the weight of all the reinforcing filler and a second portion (4112, 4122 respectively) made of a rubber composition containing at least one elastomer and at least one reinforcing filler, possibly including a carbon black, the carbon black representing a percentage greater than or equal to 0% and less than or equal to 50% of the weight of all the reinforcing filler.

Figure 12:
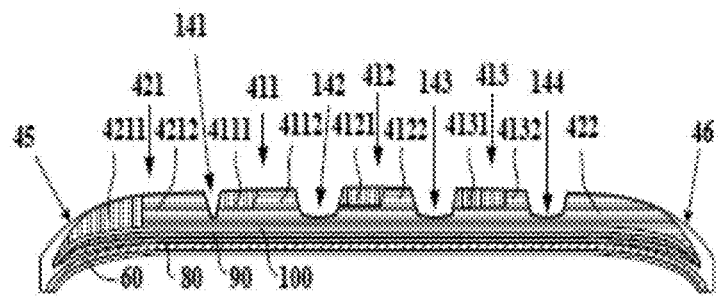

FIG. 12 schematically depicts the crown of another tire according to one embodiment of the invention. Unlike the tire depicted in FIG. 10, this tire comprises three central grooves 411 to 413 each having a first portion (4111, 4121 and 4131 respectively) made of a rubber composition containing at least one elastomer and at least one reinforcing filler including a carbon black, the carbon black representing a percentage greater than or equal to 50% and less than or equal to 100% of the weight of all the reinforcing filler, and a second portion (4112, 4122 and 4132 respectively) made of a rubber composition containing at least one elastomer and at least one reinforcing filler, possibly including a carbon black, the carbon black representing a percentage greater than or equal to 0% and less than or equal to 50% of the weight of all the reinforcing filler.

In FIGS. 9 to 11, the central ribs comprising two portions are the central ribs closest to the outer axial edge 45 because it is these central ribs that are more exposed to wear and providing the second rubber composition of these central ribs has the effect of protecting them against wear. Nonetheless, it is perfectly possible to plan for only the central rib 413 or only the central ribs 412 and 413 to comprise two portions, etc. For the sake of conciseness, these embodiments which in theory are less advantageous from a wear standpoint, have not been depicted.

Figure 13:
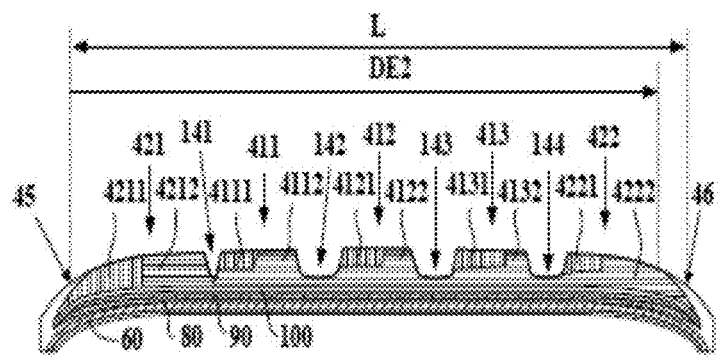
Figure 14:
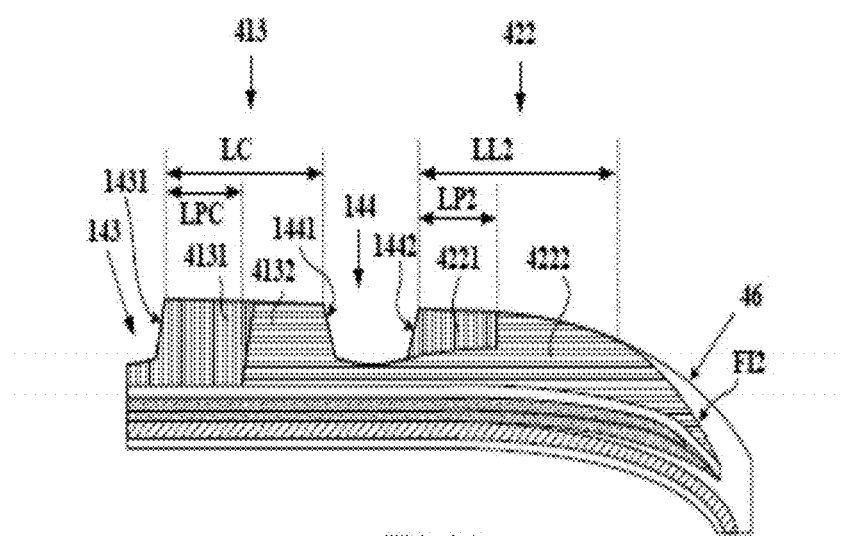

FIG. 13 schematically depicts the crown of another tire according to one embodiment of the invention; FIG. 14 shows part of this same crown. The tire depicted comprises a second lateral rib 422, which is adjacent to the inner axial edge 46 of the tread and axially delimited by an outer boundary which coincides, over the entire depth of the tread, with the lateral wall 1442 of this groove (see FIG. 14), and an inner boundary FI2 (see FIG. 14). The inner boundary FI2 is located, over the entire radial depth of the second lateral rib 422, an axial distance DE2 from the outer axial edge 45 of the tread, the distance DE2 being greater than or equal to 0.95·L. FIG. 13 indicates the axial distance DE2 of the second lateral rib 422 on the tread surface in the new state; here, DE2 is equal to 0.95·L. The axial distance between the outer boundary and the inner boundary defines an axial width LL2 (see FIG. 14) of the second lateral rib 422. In this particular instance, this axial width varies according to the radial depth of the second lateral rib 422.

The second lateral rib 422 comprises a first portion 4221, made of a rubber composition containing at least one elastomer and at least one reinforcing filler including a carbon black, the carbon black representing a percentage greater than or equal to 50% and less than or equal to 100% of the weight of all of the reinforcing filler, and a second portion 4222 made of a rubber composition containing at least one elastomer and at least one reinforcing filler, possibly including a carbon black, the carbon black representing a percentage greater than or equal to 0% and less than or equal to 50% of the weight of all the reinforcing filler.

The first portion 4221 of the second lateral rib 422 extends from the outer boundary of the second lateral rib 422 axially outwards, the axial width LP2 of this portion being, over 95% of the radial depth of the lateral rib, greater than or equal to 20% of the axial width LL2 of the second lateral rib 422. FIG. 14 indicates the axial width LP2 of the first portion 4221 of the second lateral rib 422 on the tread surface in the new state; here, the width LP2 is equal to 0.40·LL2. The second portion 4222 of the second lateral rib 422 is axially adjacent to the first portion 4221 of the second lateral rib 422; it extends, over the entire depth of the second lateral rib 422, from the end of the first portion 4221 to the inner boundary FI2 of the second lateral rib 422.

The rubber composition that makes up the second portion 4222 of the second lateral rib 422 has a tan δ0 value which is higher than the tan δ0 value of the rubber composition that forms the first portion 4221 of the second lateral rib 422.

A person skilled in the art will appreciate that the invention is not in any way restricted to a tire comprising three central ribs; it is perfectly possible to conceive of embodiments comprising one, two or more than three central ribs.

Likewise, when several central ribs comprise a first portion, there is no need for the radial depth of all the first portions to be greater than or equal to 0.2·PR and less than or equal to 0.8·PR; it is enough for this to be true of at least one of the central ribs.

Table I gives, by way of example, the composition of rubber compositions that can be used. The composition is given in PHR ("per hundred rubber") which means in parts by weight per 100 parts by weight of rubber/elastomer.

TABLE I

|  | Rubber composition forming the first portion of the rib | Rubber composition forming the second portion of the rib |
| --- | --- | --- |
| Elastomer: SBR [1] | 100 | 100 |
| N 234 [2] | 100 | — |
| Silica | — | 100 |
| TESPT coupling agent (Si69 Degussa) | — | 8.0 |
| Plasticizer [3] | 50 | 50 |
| Ozone wax C32 ST | 1.5 | 1.5 |
| Antioxidant (6PPD) [4] | 2.0 | 2.0 |
| Diphenylguanidine (DPG) | — | 1.7 |
| ZnO | 1.8 | 1.8 |
| Stearic acid | 2.0 | 2.0 |
| Sulphur | 1.3 | 1.3 |
| Accelerator (CBS) | 1.95 | 1.95 |

Notes for Table I:
[1] SSBR with 40% stirene, 48% of 1-4 trans polybutadiene functional groups
[2] Carbon black from 230 series (ASTM)
[3] TDAE (treated distillate aromatic extract) oil
[4] N-(1,3-dimethylbutyl)-N'-phenyl-p- phenylenediamine The rubber compositions are preferably based on at least one diene elastomer, a reinforcing filler and a crosslinking system.

A "diene" elastomer (used interchangeably with the word "rubber") means, in the known manner, an elastomer derived at least in part (i.e. a homopolymer or a copolymer) from diene monomers, i.e. from monomers bearing two carbon-carbon double bonds, conjugated or unconjugated. The diene elastomer used is preferably selected from the group consisting of polybutadienes (BR), natural rubber (NR), synthetic polyisoprenes (IR), butadiene-stirene (SBR) copolymers, isoprene-butadiene (BIR) copolymers, isoprene-stirene (SIR) copolymers, butadiene-stirene-isoprene (SBIR) copolymers and blends of these elastomers.

One preferred embodiment involves using an "isoprene" elastomer, i.e. a homopolymer or a copolymer of isoprene, or in other words, a diene elastomer selected from the group consisting of natural rubber (NR), synthetic polyisoprenes (IR), the various copolymers of isoprene and blends of these elastomers.

The isoprene elastomer is preferably natural rubber or synthetic polyisoprene of the cis-1,4 type. From among these synthetic polyisoprenes, use is preferably made of polyisoprenes which have a proportion (molar %) of cis-1,4 bonds higher than 90%, more preferably still, higher than 98%. According to other preferred embodiments, the diene elastomer may consist, in full or in part, of another diene elastomer such as, for example, an SBR elastomer (E-SBR or S-SBR) used cut or otherwise with another elastomer, for example of the BR type.

The rubber composition may also contain all or some of the additives conventionally used in the rubber matrixes intended for tire manufacture, such as, for example, reinforcing fillers such as carbon black or inorganic fillers such as silica, coupling agents for inorganic fillers, anti-ageing agents, antioxidants, plasticizers or extension oils, whether the latter be of aromatic or non-aromatic nature (notably oils that are very weakly aromatic or non-aromatic, for example of the naphthene or paraffin type, of high or preferably low, viscosity, MES or TDAE oils, plasticizing resins with a high TG above 30° C.), processability agents for the compositions in the raw state, tackifying resins, a cross-linking system based either on sulphur or on donors of sulphur and/or peroxide, accelerators, vulcanization activators or retardants, antireversion agents, acceptors and donors of methylene, such as, for example, HMT (hexamethylenetetramine) or H3M (hexamethyoxymethylmelamine), reinforcing resins (such as resorcinol or bismaleimide), known adhesion-promotion systems of the metallic salt type, for example, notably salts of cobalt or of nickel.

The compositions are produced in suitable mills, using two successive preparation phases well known to those skilled in the art: A first phase of thermo mechanical working or kneading (the phase referred to as the "non-productive" phase) at high temperature, up to a maximum temperature of between 110° C. and 190° C., preferably between 130° C. and 180° C., followed by a second phase of mechanical work (the phase referred to as the "productive" phase) up to a lower temperature, typically below 110° C., during which finishing phase the cross-linking system is incorporated.

By way of example, the non-productive phase is conducted in a single thermomechanical step lasting a few minutes (for example between 2 and 10 min), during which all the required basic ingredients and other additives, apart from the cross-linking or vulcanizing system are introduced into a suitable mill such as a conventional internal mixer. After the rubber composition thus obtained has cooled, the vulcanizing system is then incorporated in an external mixer such as an open mill, kept at a low temperature (for example between 30° C. and 100° C.). The mass is then mixed (productive phase) for a few minutes (for example between 5 and 15 min).

Vulcanizing (or curing) can be performed in the known way at a temperature generally of between 130° C. and 200° C., preferably under pressure, for a sufficient length of time which may vary for example between 5 and 90 min notably dependent on the curing temperature, on the vulcanizing system adopted and on the vulcanizing dynamics of the composition concerned.

Table II gives the properties of the rubber compositions the composition of which is given in table I.

TABLE II

|  | Rubber composition forming the first portion of the rib | Rubber composition forming the second portion of the rib |
| --- | --- | --- |
| tan δ0 to 0.7 MPa | 0.76 | 0.88 |
| tan δ10 to 0.7 MPa | 0.69 | 0.58 |

These properties are measured on a viscoanalyzer, known by the name "Metravib VA4000" (registered trademark), in accordance with standard ASTM D 5992-96. The response of a sample of vulcanized composition (cylindrical test specimen 4 mm thick and 400 mm$^2$ in cross section) subjected to a simple alternating sinusoidal shear stress at a frequency of 10 Hz is recorded with a temperature sweeping between 0° and 100° C., under a fixed stress of 0.7 MPa, with the tan δ value observed at 0° C. and the tan δ values observed at 10° C. being recorded in particular.

It will be recalled that, as is well known to those skilled in the art, the tan δ value at 0° C. ("tan δ0") is indicative of the potential to grip on wet ground: the higher the tan δ at 0° C., the better the grip. The values of tan δ at temperatures higher than 10° C. are indicative of the hysteresis of the material and of the potential to grip on dry ground.

Returning to the rubber compositions the composition of which is indicated in table I, it is noticed that the composition that forms the second portions has a value of tan δ at 0° C. (under an imposed stress of 0.7 MPa) that is higher by comparison with the composition that forms the first portions, indicating that the wet grip will be better; and a value of tan δ at 10° C. ("tan δ10") that is lower by comparison with the first composition, this indicating that the grip on dry ground will be inferior.

Tests were carried out on a vehicle known by the name "BMW 330i" (registered trademark) fitted with Pilot Super Sport tires of size 235/35 R19. A tire equipped with a tread as depicted in FIG. 10 was compared against a reference tire equipped with a tread as indicated in FIG. 8 and an intermediate tire in which the first part of the central rib extends over the entire radial depth of the central rib. The rubber compositions of table I were used. The tires according to one embodiment of the invention were able to maintain the lap times (Charade circuit (France); circuit length: 4 km) on dry ground. Braking in the wet, by contrast, was significantly improved (by 2%) whereas there was no difference in braking on dry ground. Limiting the depth of the first part of the central rib has the effect of reducing the rolling resistance by 3%.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire adapted to be mounted on a mounting rim of a wheel of a vehicle and having a predetermined direction of mounting on the vehicle, comprising a tread extending between an outer axial edge and an inner axial edge the inner axial edge being an edge intended to be mounted on a vehicle body shell side when the tire is mounted on the vehicle in the said predetermined direction of mounting, an axial distance between the outer axial edge and the inner axial edge defining an axial width L of the tread;

wherein the tread comprises, in any radial section, at least one central rib and two lateral ribs, the lateral ribs being positioned one on each side of the said at least one central rib, the ribs being separated by circumferential grooves each having two lateral walls;

wherein each central rib is axially delimited by an outer boundary and by an inner boundary, each boundary being formed by a lateral wall of a circumferential groove, the inner boundary being axially closer to the inner axial edge of the tread than the outer boundary, the axial distance, on the tread surface in the new state, between the outer boundary and the inner boundary defining an axial width LC of the central rib;

wherein a first lateral rib is adjacent to the outer axial edge of the tread and delimited axially by an outer boundary and an inner boundary, the outer boundary being situated, over the entire radial depth of the first lateral rib, an axial distance DE1 from the inner axial edge of the tread, the distance DE1 being greater than or equal to 0.95·L, the inner boundary being formed, at least in part, by a lateral wall of a circumferential groove, the axial distance between the outer boundary and the inner boundary defining an axial width LL1 of the first lateral rib;

wherein the first lateral rib and at least one of the central ribs comprise a first portion made of a rubber composition containing at least one elastomer and at least one reinforcing filler containing a carbon black, the carbon black representing a percentage greater than or equal to 50% and less than or equal to 100% of the weight of all the reinforcing filler, and a second portion made of a rubber composition containing at least one elastomer and at least one reinforcing filler;

wherein the first portion of the first lateral rib extends from the outer boundary of the first lateral rib axially inwards, the axial width LP1 of this portion being, over the entire radial depth of the lateral rib, greater than or equal to 20% of the axial width LL1 of the first lateral rib, and wherein the second portion of the first lateral rib is axially adjacent to the first portion of the first lateral rib;

wherein the first portion of the central rib extends:

axially from the outer boundary of the central rib, the axial width LPC of this portion being, over at least 75% of the radial depth PR of the central rib, greater than or equal to 20% of the axial width LC of the central rib, and radially from the tread surface, when new, as far as a radial depth P, the radial depth P being able to vary as a function of the axial position, the depth P being, over at least 75% of the axial extent of the first portion of the central rib, greater than or equal to 0.2·PR and less than or equal to 0.8·PR;

wherein the second portion of the central rib is axially adjacent to the first portion of the central rib;

wherein the rubber compositions that make up the second portion of the first lateral rib, the portion radially on the inside of the first portion of the central rib and the second portion of the central rib all have a tan δ0 value which is higher than the tan δ0 value of the rubber compositions that form the first portion of the first lateral rib and the first portion of the central rib, where tan δ0 denotes the tan δ value measured at a temperature of 0° C. and under a stress of 0.7 MPa.

2. The tire according to claim 1, wherein the axial width LP1 of the first portion of the first lateral rib is, over the entire radial depth of the first lateral rib, less than or equal to 60% of the axial width LL1 of the first lateral rib.

3. The tire according to claim 1, wherein the axial width LPC of the first portion of the central rib is, over its entire radial depth, less than or equal to 60% of the axial width LC of the central rib.

4. The tire according to claim 1, wherein a second lateral rib is adjacent to the inner axial edge of the tread and axially delimited by an outer boundary and an inner boundary (FI2), the inner boundary being situated, over the entire radial depth of the second lateral rib, an axial distance DE2 from the outer axial edge of the tread, the distance DE2 being greater than or equal to 0.95·L, the outer boundary being formed, at least in part, by a lateral wall of a circumferential groove, the axial distance between the outer boundary and the inner boundary defining an axial width LL2 of the second lateral rib;

wherein the second lateral rib comprises a first portion made of a rubber composition containing at least one elastomer and at least one reinforcing filler containing a carbon black, the carbon black representing a percentage greater than or equal to 50% and less than or equal to 100% of the weight of all the reinforcing filler, and a second portion made of a rubber composition containing at least one elastomer and at least one reinforcing filler;

wherein the first portion of the second lateral rib extends from the outer boundary of the second lateral rib axially outwards, the axial width LP2 of this portion being, over at least 75% of its radial depth, greater than or equal to 20% of the axial width LL2 of the second lateral rib, and in which the second portion of the second lateral rib is axially adjacent to the first portion of the second lateral rib;

wherein the rubber composition forming the second portion of the second lateral rib has a tan δ0 value which is higher than the tan δ0 value of the rubber composition that forms the first portion of the second lateral rib.

5. The tire according to claim 4, wherein the axial width LP2 of the first portion of the second lateral rib is less than or equal to 60% of the axial width LL2 of the second lateral rib.

6. The tire according to claim 1, wherein, for each rib comprising a first and a second portion, the difference between the tan δ0 value of the rubber composition that forms the first portion of the rib and the tan δ0 value of the rubber composition that forms the second portion of the same rib is greater than or equal to 0.05.

7. The tire according to claim 1, wherein, for each rib comprising a first and a second portion, the rubber composition that forms the first portion of the rib also has a tan δ10 value which is higher than the tan δ10 value of the rubber composition that forms the second portion of the same rib, where tan δ10 denotes the tan δ value measured at a temperature of 10° C. and under a stress of 0.7 MPa.

8. The tire according to claim 7, wherein, for each rib comprising a first a second portion, the difference between the tan δ10 value of the rubber composition that forms the first portion of the rib and the tan δ10 value of the rubber composition that forms the second portion of the same rib is greater than or equal to 0.05.

9. The tire according to claim 1, wherein the same rubber composition forms the first portion of all the ribs that have a first and a second portion, and the same rubber composition forms the second portion of these ribs.

10. The tire according to claim 1, wherein the at least one reinforcing filler of said second portion of the first lateral rib includes a carbon black, the carbon black representing a percentage greater than or equal to 0% and less than or equal to 50% of the weight of all the reinforcing filler.

11. The tire according to claim 4, wherein the at least one reinforcing filler of said second portion of the second lateral rib includes a carbon black, the carbon black representing a percentage greater than or equal to 0% and less than or equal to 50% of the weight of all the reinforcing filler.

12. The tire according to claim 1, wherein each of the central ribs comprise the first portion and the second portion.

\* \* \* \* \*